June 25, 1935.  W. K. BURGESS  2,005,728
AMPHIBIAN
Filed Oct. 14, 1932   6 Sheets-Sheet 1
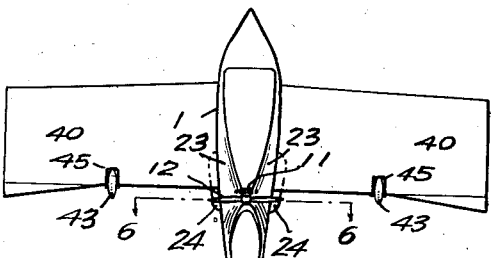
FIG. 1.
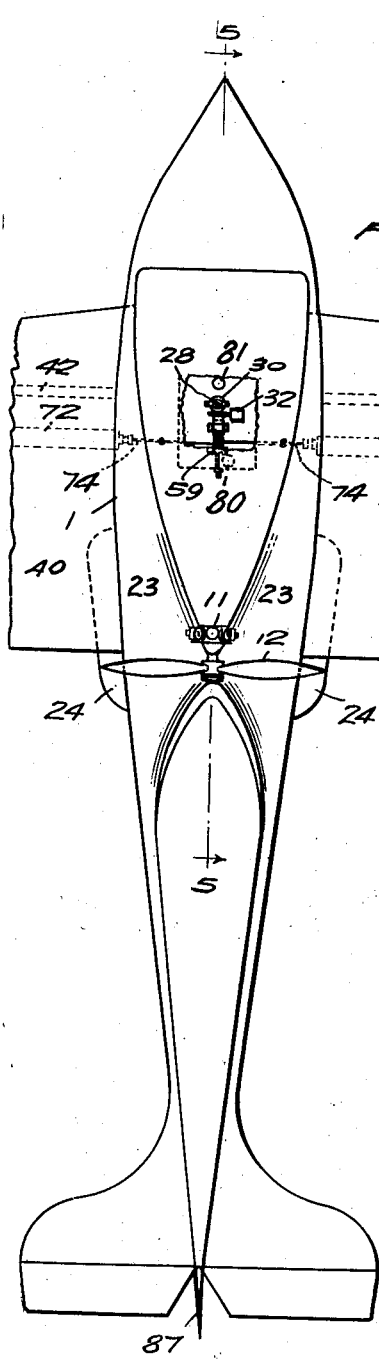
FIG. 2.
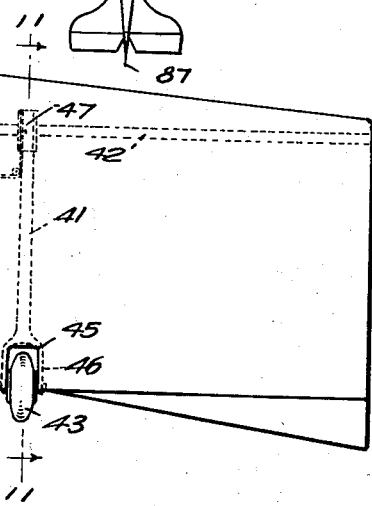
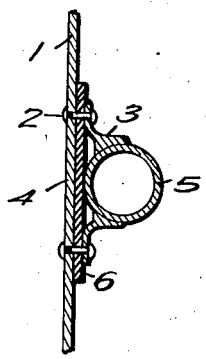
FIG. 3.
INVENTOR
WALTER K. BURGESS
BY Francis H. Vanderwerker
Wade Koontz
ATTORNEYS

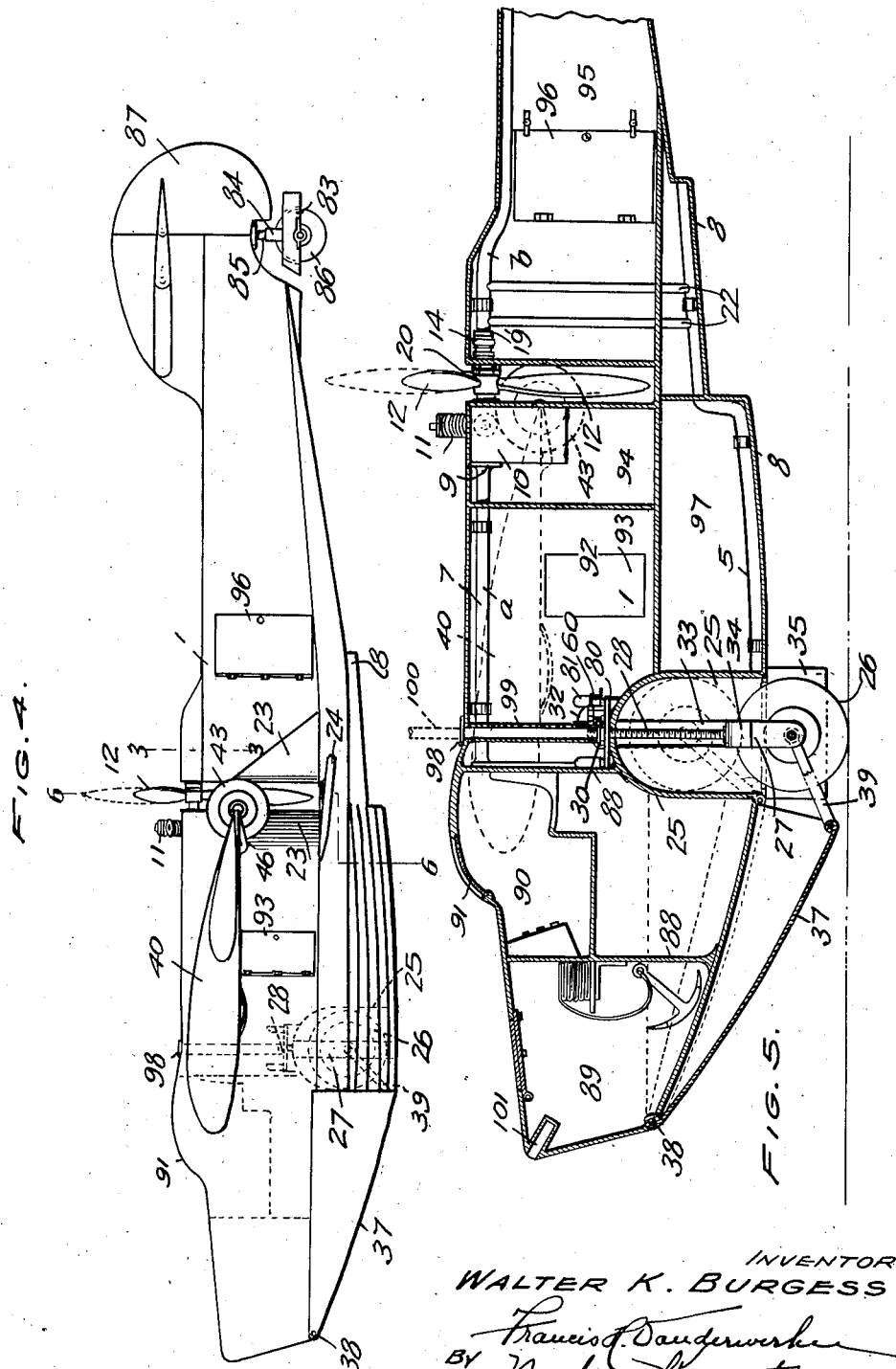

June 25, 1935.  W. K. BURGESS  2,005,728
AMPHIBIAN
Filed Oct. 14, 1932   6 Sheets-Sheet 3

INVENTOR
WALTER K. BURGESS
BY
ATTORNEYS

June 25, 1935.  W. K. BURGESS  2,005,728
AMPHIBIAN
Filed Oct. 14, 1932   6 Sheets-Sheet 4
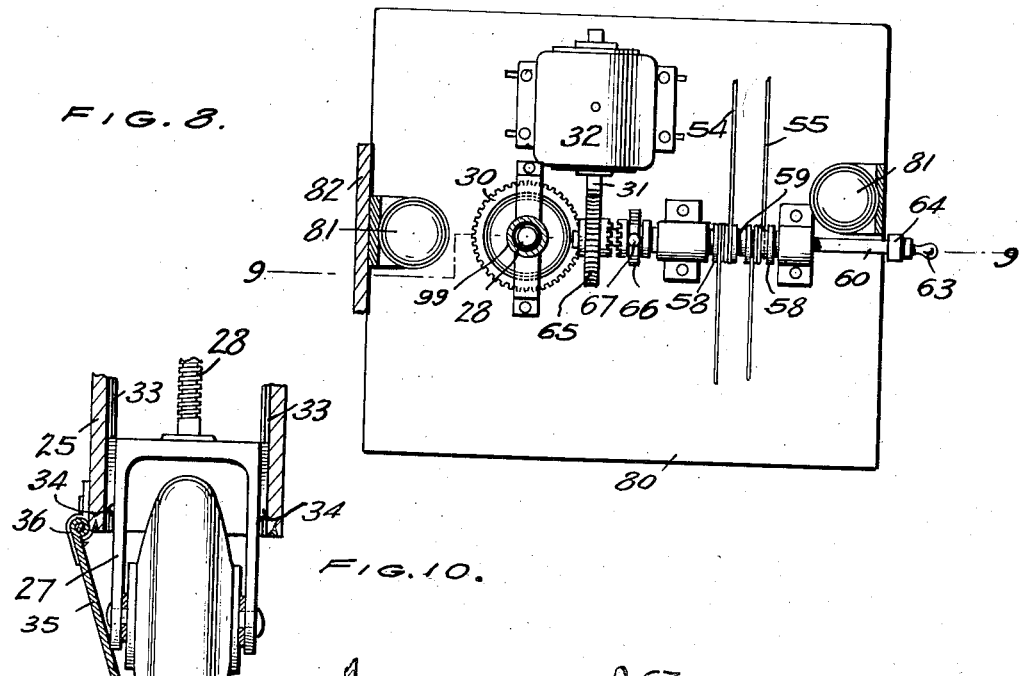
FIG. 8.
FIG. 10.
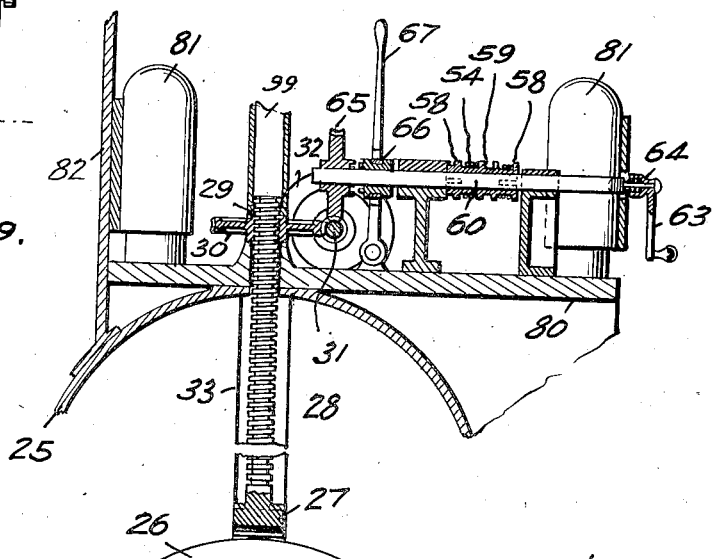
FIG. 9.
INVENTOR
WALTER K. BURGESS
BY
ATTORNEYS

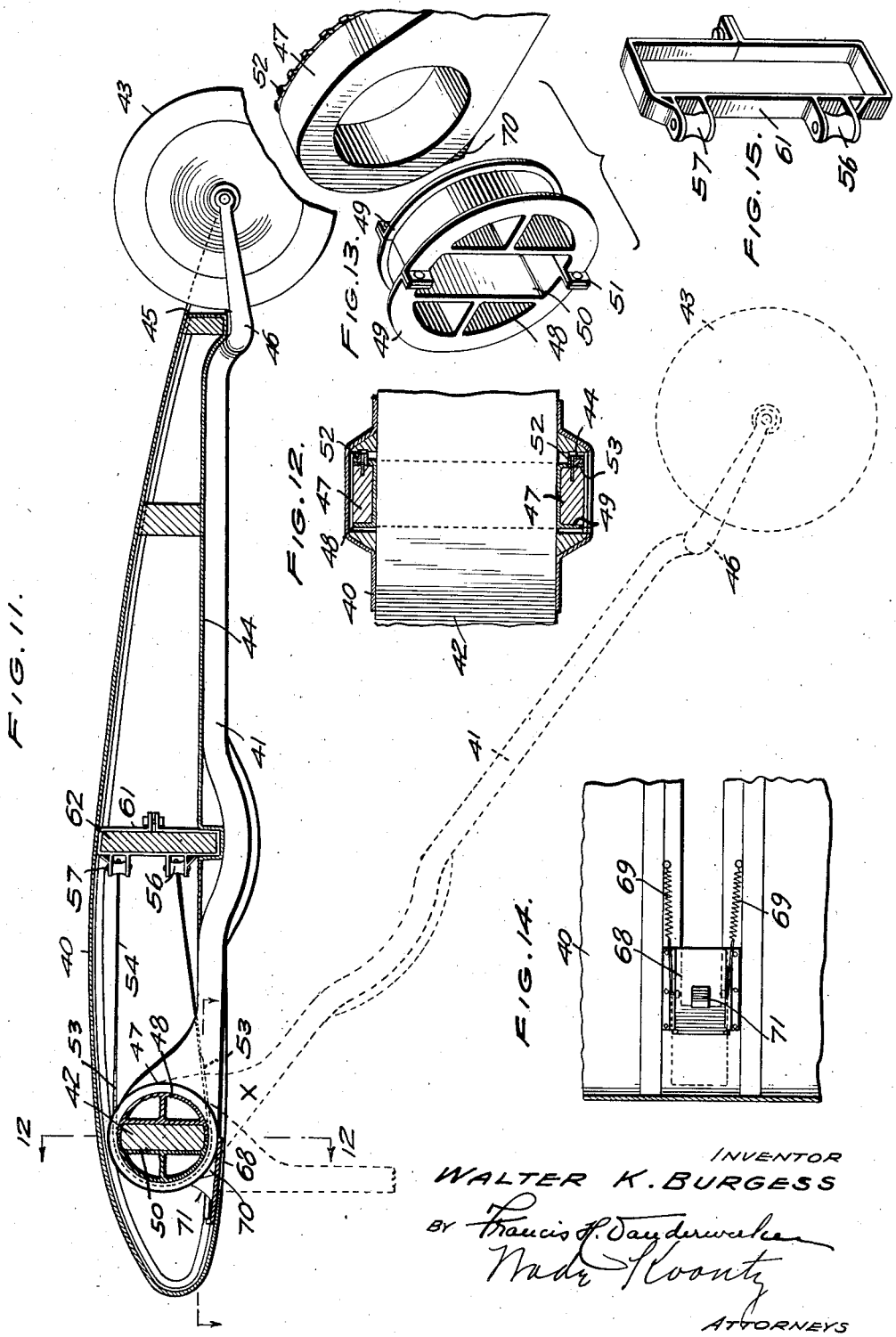

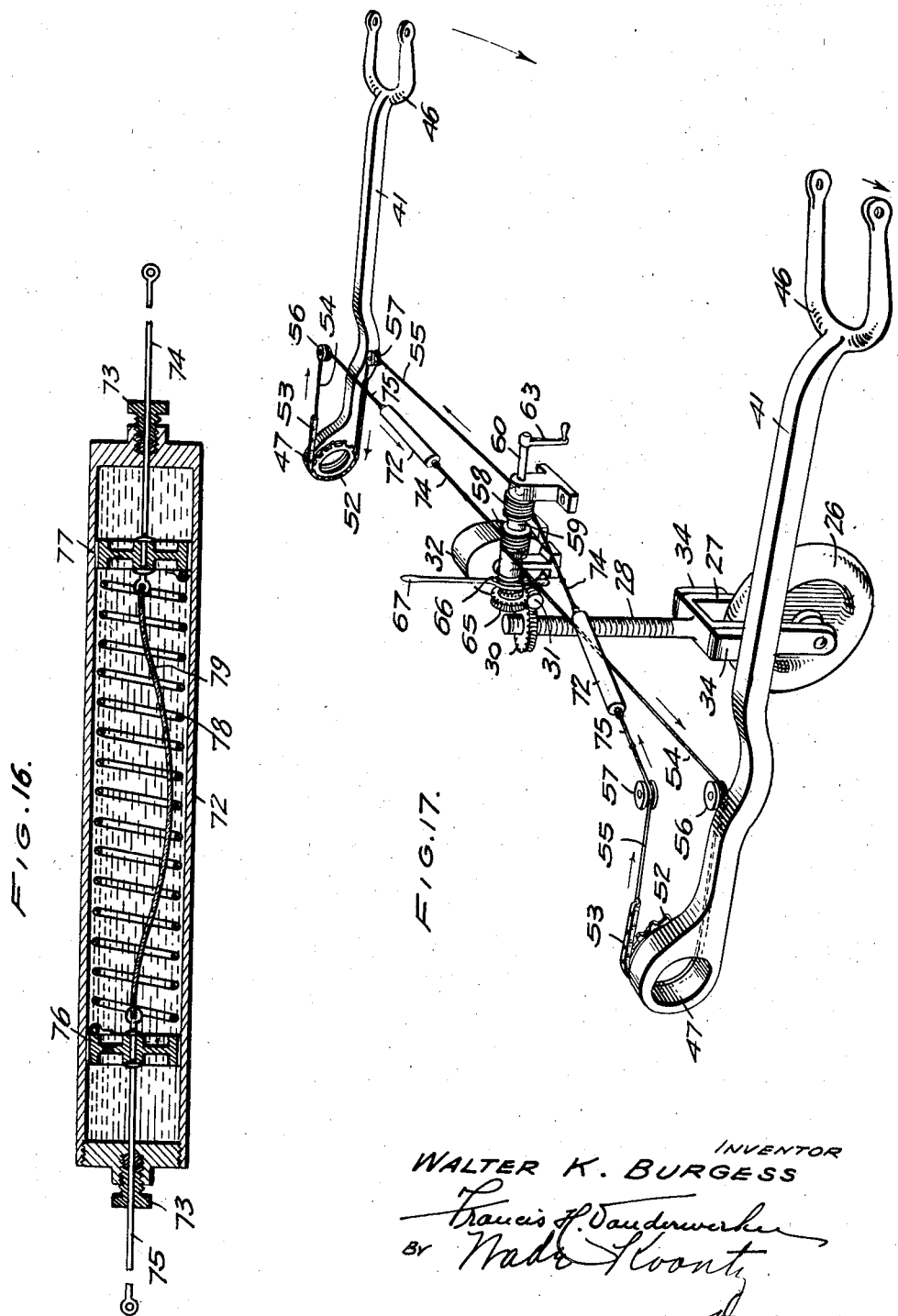

Patented June 25, 1935

2,005,728

UNITED STATES PATENT OFFICE 2,005,728

AMPHIBIAN

Walter K. Burgess, Chanute Field, Rantoul, Ill.

Application October 14, 1932, Serial No. 637,775

5 Claims. (Cl. 244—25)

(Granted under the act of March 3, 1883, as amended April 30, 1928; 370 O. G. 757)

This invention relates to aircraft and particularly to aircraft of the amphibian type designed for use on land and sea.

The primary object of the invention is to provide a generally improved amphibian design incorporating structural features applicable to flying craft in general and in particular the fuselage of such, and combining the desirable characteristics of a speed boat hull and an airplane fuselage.

With the above in view, the invention consists more specifically in providing, 1st, a novel design of fuselage structure and boat framing and manner of attaching both inside and outside covering planking, etc.; 2nd, novel propulsion means adapted for aircraft, surface craft, or subsurface craft; 3rd, improved means of propeller mounting incorporating a main bearing and a thrust bearing on either side of the propeller; 4th, a novel retractable landing gear including wing tip wheels and floats; 5th, increased cabin area; and 6th, better streamlining plus greater strength, airworthiness and seaworthiness.

Additional advantages and novel features will be apparent from the following detailed description of the invention, supplemented by the accompanying drawings wherein:—

Figure 1 is a top plan view of an amphibian craft designed in accordance with the principles of the invention:

Figure 2 is an enlarged top plan view of the amphibian, with parts broken away.

Figure 3 is a section of the fuselage on line 3—3 of Fig. 4;

Figure 4 is a side elevation;

Figure 5 is a vertical longitudinal section on line 5—5 of Figure 2;

Figure 8 is a top plan, partly in section, of the landing gear operating mechanism;

Figure 9 is a vertical section on line 9—9 of Fig. 8.

Figure 10 is a section through the center landing wheel well.

Figure 11 is a section on line 11—11 of Fig. 2.

Figure 12 is a section on line 12—12 of Fig. 11.

Figure 13 is a detail perspective view of a hinge assembly for the wing tip wheels and floats.

Figure 14 is a detail view of the wing slot closure.

Figure 15 is a perspective view of one of the pulley brackets.

Figure 16 is a longitudinal sectional view of one of the outrigger shock absorbing devices, and Figure 17 is a detail perspective view of the landing gear assembly.

Figure 6:
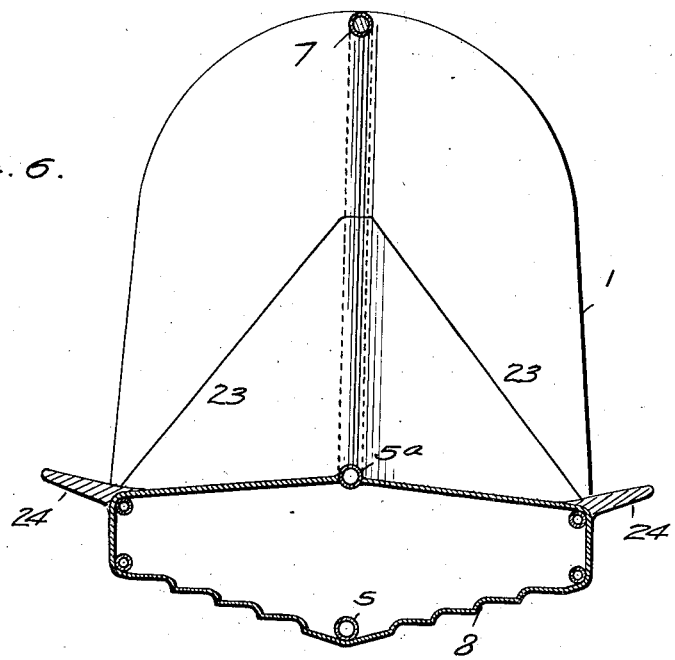
Figure 6 is a vertical transverse section through the fuselage on line 6—6 of Fig. 1.
Figure 7:
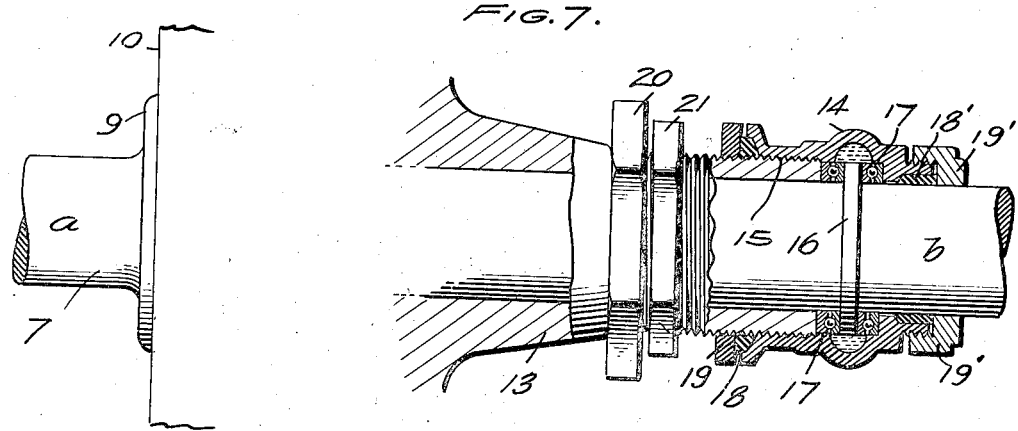
Figure 7 is a sectional view showing details of the propeller hub bearings.

Heretofore, all attempts at an amphibian design have been from a land plane viewpoint. An attempt has been made here more from the opposite angle since there is inherent in a good, light, boat hull most of those elements of streamline lightness and compactness desirable in an airplane fuselage. It is believed, more nearly possible to make, starting from such a seaworthy premise, a suitable and satisfactory airworthy craft than it is to make even a remotely seaworthy craft by starting from the opposite premises of a suitable and airworthy land type airplane.

The fuselage of this amphibian is, therefore, in itself a full decked sea craft embodying ideas from a speed boat with the seaworthy bow and forward decks of a cabin cruiser. The hull or fuselage framework is composed of welded-steel tubing and the hull or fuselage bottom and sides, to one foot above water line, are of 18 gauge stainless steel sheets 1 riveted with rivets 2 of the same material to special rivet flanges 3 welded, as shown at 4 in Fig. 3, to the hull or fuselage steel tubing frames 5 with a strip 6 of gasket material lying between. The gasket material takes up shocks and in particular deadens vibration and sound. The sides, deck, and wing may be covered with plywood or metal with duraluminum strips, lying over outside of plywood at the fastening points or lines, through which small threaded bolts are passed; the latter holding the plywood to the face flanges provided on the hull or fuselage steel tubular framework in the same manner as the bottom is attached.

Fundamental in this design is the placing of the propeller and the shaping of the fuselage to permit of this. All previous pusher type seaplanes are either of low boat hull fuselage with the motor and propeller mounted on struts to clear the hull fuselage deck, or the motor and propeller are placed aft of a stubby unstreamlineable cabin and above a cutaway boat hull or fuselage which is made shallow from the motor aft. In the present design the regular contours of a conventional fuselage have been retained plus the addition of a second keel or backbone 7 above the boat hull keel 8 and the contraction of the fuselage at a substantially central point above the water line or the spray deck line causing it to somewhat resemble an hourglass, as shown in Figs. 1 and 2.

The backbone 7 is a steel tube composed of fore and aft sections "a" and "b" extending centrally and longitudinally of the fuselage. Section "a" has the end adjacent the contracted part of the fuselage provided with a flange 9 for attachment to the motor crank case 10 of the propeller power plant 11 which is located in the space between the adjacent ends of sections "a" and "b". The aft section "b" of the upper fuselage keel 7, in addition to reinforcing the fuselage structure, also serves as a support for the aft end of the propeller 12 thereby providing two propeller bearings one on either side. In carrying out this idea, the end of section "b" extends into the tubular propeller hub 13 with flange 16 bearing against the end of the propeller hub 13 and is coupled to the latter by means of a union coupling member 14 having screw-threaded engagement with the propeller hub, as shown at 15, and having a hollow oil chamber to accommodate the thrust collar 16 integral with the aft section of keel 7. Double ball races are provided on opposite sides of the thrust collar, as shown at 17. The coupling 14 is provided at its ends with felt oil-retaining washers 18—18' held in place by spanner or jam nuts 19—19'. The propeller hub nut and locking nut are shown at 20 and 21 respectively. The bearing end of keel section "b" is braced and reinforced by supports 22 rising from the lower keel 8 and welded to the under side of section "b" of the upper keel 7 rearwardly of the coupling 14.

This upper keel or backbone 7 retains and makes possible the correct fuselage streamline. It adds greatly to the rigidity of the fuselage or boat structure, a factor vital to airplane operations from water or rough broken ground. It adds, and makes possible, a second or rear propeller hub bearing, relieving the motor or crank case and engine beds of much of this strain and, in particular, by this double propeller hub bearing, one on each side of the propeller hub, it cuts down propeller flutter and vibration. This design relieves and makes possible the division of the propeller thrust bearing load, all formerly carried by and through the motor crank case. In this design, it is transferred in large part directly to the fuselage structure itself without going through the motor thrust bearing, crank shaft, and motor mountings. Better streamlining, greater strength, rigidity, apportionment of air keel surface, airworthiness and seaworthiness are available than existed heretofore in any type.

The hourglass design of the fuselage is of advantage in that it permits incorporating, in a true streamlined airplane or seaplane fuselage, a gate or slot for a propeller, particularly a pusher propeller, within the fuselage proper with the backbone or upper keel serving as the axle or bearing of the propeller. The engine 11 may be any suitable type, such as a Wasp or Hornet P. & W. radial air cooled motor or an inverted air cooled or fluid cooled motor. The propeller hub 13 may carry any suitable number of removable propeller blades 12, preferably three, as shown in the accompanying drawings. The floor and sides of the propeller gate or slot are sloped as shown to provide a spray deck 23 for the propeller. Full maximum spray protection for the propeller is obtained by the provision of spray boards 24 of true airfoil section, secured to the fuselage and setting at a slight dihedral angle to the propeller disk 23. In rough weather while resting on the sea these extra spray boards serve as anti-roll or bilge keels and add materially to the sea worthiness of this craft.

Centered longitudinally of the craft and located near the bow thereof is a wheel well 25 in which operates the center or main landing wheel 26. This center wheel is journaled in a fork 27 at the lower end of a screw staff 28 and is adapted to be raised and lowered by suitable wheel depressing and elevating mechanism. Normally, the wheel 26 is in raised position within the well, being housed therein as shown in dotted lines in Figures 4 and 5. A mechanism for operating the wheel is illustrated in Figures 16 and 17 and, as there shown, comprises a nut 29 on the screw-staff 28 having external teeth 30 in mesh with the worm shaft 31 of the landing gear motor 32. An electric motor is employed, with the controls in the pilot's cockpit. Rotation of the nut 29 in one direction lowers the wheel below the well, as shown in full lines in Fig. 5, for landing on water or ground and rotation of the nut in the reverse direction causes the wheel to be drawn up into the well. Guide means, such as guide channels or grooves 33 in the confining wall of the well engaged by guide-runners 34 carried by the fork serve to brace and to steady the wheel in the vertical movement. The well 25 is provided, also, with a seatight self-closing bailer or door 35 which is hingedly connected to the bottom of the well on one side of the main landing wheel by a spring hinge 36 yieldably holding the door in its closed position.

A forward keel skid 37 is hingedly connected at 38 to the bow of the fuselage hull and is shaped in conformity with the latter to provide a keel cap adapted, in its raised or normal position, to fit snug and close against the hull with which it is streamlined. The skid extends rearwardly from its hinge to the forward side of the wheel well 25 and is connected at its free end by suitable linkage 39 with the wheel fork 27 so as to work in conjunction with the depressing and raising mechanism of the main wheel. This skid is of value in stony, rough, or stumpy ground in that it will carry the nose of the plane up over such obstructions to the pneumatic tire of the wheel 26 and will prevent the carrying away of the wheel and gear, as would result in an unguarded wheel structure from a blow falling at or near the same horizontal plane as that passing through the wheel axle. This keel skid is always depressed when the main or center landing wheel 26 is down. Likewise, it is always up in place against the forward keel when the landing wheel is drawn up. This feature is further of vital importance in case a landing should, through mistake, be made in water with landing gear or wheel down, this keel skid acts as a forward bow to the wheel, opening a path in the water for the wheel and preventing a disaster similar to those occurring with current amphibian designs when landing in water with landing gear not drawn up.

In order to meet a variable condition of sea or terrain on which the aircraft might be landing, adjustable outrigger pontoons or outboard landing gear wheels are provided. In the embodiment herein disclosed, these outboard floats and wheels are incorporated in the structure of the sustaining wing 40. The wing 40 is a modified thick airfoil section throughout with its upper surface streamlining with and into the fuselage top or boat hull upper deck, together with streamlining in the angles of junction of wing and fuselage or boat hull.

The wing floats or outrigger landing devices consist of arm sections 41, each of which is hinged preferably about the forward wing spar 42, or at the wing entering edge, and carries a wheel 43 in its trailing end, the housing and streamlining of which forms a pontoon float added to by the wheel itself. These wing tip floats and wheels may be designed and built into the wing structure in the manner disclosed in Fig. 11. As shown therein, each hinged arm section 41 in its normal position fits close up against the underside of the wing 40 which may be streamlined and recessed as shown at 44, to accommodate the arm and also notched, as at 45, to provide clearance for the wheel fork 46 and the wheel 43.

A convenient form of hinge mounting for the wing floats is shown to advantage in Figs. 11 to 13, inclusive. Each arm section 41 has a hub 47 at its pivotal end which is journaled in a channeled bearing sleeve or ring 48, the side flanges 49 of which prevent lateral displacement of the hub. The bearing 48 is made in two sections with complemental rim and spider portions forming a socket 50 for embracing the forward wing spar 42 to which the sections are clamped by suitable fastenings 51. These arm sections 41, when raised or lowered, move through an arc of 90 degrees and when swung downwardly as indicated by the dotted line of Fig. 11 they provide, in conjunction with the main or center landing gear wheel 26 a tri-wheel landing device with the outrigger wheels 43 disposed rearwardly and laterally of the center wheel, as is apparent from Fig. 1.

A mechanism for raising and lowering the outrigger landing gear is shown in Fig. 17. Each arm 41 is provided, on the inner side surface of the hub 47, with a sprocket 52 over which is trained a length of chain 53. The chains 53 are coupled by separate cables 54 and 55 so that the upper terminal of each chain is connected to the lower terminal of the other chain; cable 54 passing around guide pulleys 56 and cable 55 passing around guide pulleys 57. These cables also pass twice around separate portions 58 of a winding spool or drum 59, the latter being fixed on a shaft 60 and the winding of the cables being such that both right and left hinged arm sections 41 move in unison and in the same directions, when raised and lowered for purposes of landing. Each pair of supporting pulleys 56 and 57 are carried by a loop bracket 61, shown in Fig. 15, which is clamped about an inner wing spar 62 as shown in Fig. 11. The spool shaft 60 is provided with a crank handle 63 to permit the outrigger landing devices to be operated manually; the crank handle being in operative position relative to the shaft only when pushed in against the resistance of the spring 64, as shown in Fig. 9.

Means are provided, also, for coupling the spool shaft with the main or center landing gear driving motor so that the wing or outrigger landing devices may, when desired, be operated automatically and in conjunction with the raising and lowering of the main center landing wheel 26. For this purpose, a worm gear 65 is mounted on the spool shaft 60 and is driven by the worm 31 of the main or center landing gear motor 32. Gear 15 revolves on the spool shaft 60 and is adapted to be placed in driving relation therewith by any suitable clutch mechanism, such as conventionally shown at 66. When the clutch is engaged, by the proper movement of the clutch lever 67, the center landing gear and the outrigger landing are simultaneously operated. When the clutch is disengaged, either gear may be operated independently of the other.

The short opening required in the underside leading edge of the wing 40 forward of the front spar for the free movement of the part $x$ of each outrigger wheel carrier 41 is provided with a slidable closure in the form of a plate 68 conforming to the wing curvature and held close against the underside of the hub 47 by a pair of springs or other elastic elements 69. A pusher element, such as a raised projection or lug 70 on the hub 47 contacts with an abutment 71 on the upper side of the plate 68 and pushes the plate forwardly against the action of the springs 69 as the member 41 moves downwardly. During the upward movement of the member 41, the plate is drawn inward in the wake of the receding carrier-portion $x$ by the pull of the springs 69. By means of this closure arrangement the continuity of the lower wing surface remains unbroken during the operation of the landing gear and the aerodynamic efficiency of the wing is unimpaired.

To provide flexibility of the outboard landing gear wheels and floats 43 and to absorb the shocks imparted thereto by impact with rough, uneven, ground or choppy sea, each outboard landing gear control cable is provided with a hydraulic shock absorber including a cylinder 72 filled with oil and having its closed ends provided with packing glands 73 through which slide the plunger rods 74 and 75 carried by the plungers 76 and 77. The plungers are yieldably connected by an intervening spring 78 and by a slack cable 79. The outer ends of the plunger rods are connected to section of cables 54 and 55. The main or center landing gear driving motor 32 and the outrigger landing gear drive shaft 60, together with their associated gears, bearings, etc., are mounted on a common table or platform 80, as disclosed in Figs. 8 and 9, which platform is yieldably suspended by hydraulic shock absorber 81, suitably fixed to the fuselage frame, as at 82.

The tail skid includes a streamlined sea-rudder 83 joined by a yoke 84 to the rudder post 85 and having a central opening in which is journaled a landing wheel 86. By means of this arrangement, the tail skid is synchronized with the air rudder 87 and is operated by the air-rudder controls. Various bulkheads 88 are provided and arranged as shown in Fig. 5 to provide various water tight and other compartments such as an anchor and rope locker 89, an open pilot's cockpit 90 with windshield 91, a passenger cabin 92 having passage way to pilot cockpit on either side of wheel well and a door 93, an engine room 94, a cargo space 95 having a door 96 and gas and oil compartments 97. For military purposes, cabin area is thus available for bombs, machine gun mounts, radio, navigation and photographic equipment, and for observer's quarters if desired. All cabin, engine room, and cargo space doors are fitted with crepe rubber jambs and thumbscrew fasteners are attached, in addition to catch, by which they may be made seatight from either outside or inside. In case of a forced landing on the sea, a sailing mast socket is available by raising the top hinged cover cap 98 to a guide tube 99 provided for the main or center wheel worm staff 28. The mast heel or butt fits into the socket tube 99 as indicated by the dotted line structure 100 of Fig. 5. A socket for a bow sprit is also provided, as shown at 101.

The hinged arm sections carrying the outboard landing wheels and floats may be operated both by electric motor and manually, as previously described, or any other combination such as moving one ahead of the other may be had that the pilot believes will best suit a given condition of wind and sea or landing area, as stumpy, rough, stony ground, or grass mound terrain. In making a landing under such conditions, whether sea or land, the desired amount of wing wheel or pontoon depression may be selected and that amount used just when desired. It is not necessary to glide to a landing, either sea or land, with wheels and floats down. When flying on a rough or choppy sea, the best combination of the outrigger stability principle is provided and made available that in the judgment of the pilot is suited to a particular wind and sea condition. The center or main landing wheel may also be depressed to serve as a center board affording extra keel area when the craft is under sail or lying without power in a wind and rough sea.

An amphibian designed and constructed as herein disclosed combines the good features of a fully seaworthy and sturdy speed boat or cruiser design with an airplane fuselage and finally, one very important defect inherent in all tractor types is eliminated. It is believed this defect is generally overlooked, or if noted, not given the consideration it merits. Reference is made to the necessity of the pilot to navigate with vision directly through the propeller blur. For short flights, or for flights away from the sun, this defect may not register but for long flights, particularly those facing the sun or above a glassy sea or shimmering desert area, this propeller blur or sheen develops into a very definite hardship and eye-strain. This may be only temporary, yet it is believed it is serious enough in many instances to result after a number of years in permanent visual derangement.

If a multi-motored plane is desired, using this design, the additional motors may be placed outboard either as pushers or tractors, or superimposed on the wing. In either case when used on an amphibian unless superimposed, they would require spray tables or small deck areas beneath the propellers in the manner of a narrow wing section.

I claim:

1. An amphibian plane comprising a unit boat hull and airplane fuselage structure having a propeller gap at the waist of the structure opening upwardly and laterally from adjacent the water line of the boat hull to the top of the airplane fuselage, the latter being thereby separated into fore-and-aft fuselage sections, a wing attached to the top of the fuselage forward section, an empennage at the rear of the fuselage aft section, and an engine-propeller unit mounted between the fore-and-aft fuselage sections with the engine substantially housed within the upper rear portion of the forward fuselage section and the propeller disposed in the said propeller gap with its axis of rotation at the upper end of the gap and its disk area extending outwardly of the gap and substantially beyond the top and sides of the fore-and-aft fuselage sections.

2. In an amphibian plane, a unit boat hull and airplane fuselage structure having the upper or airplane fuselage portion constricted in width at or near the waist and divided transversely of the constricted area to provide fuselage sections forward and aft of a propeller space extending between the top of the fuselage portion and the deck of the hull, a longitudinal strength member at the top and center of each fuselage section, an engine-propeller unit connected to and supported by and between the forward and aft fuselage strength members with the propeller disposed in the said propeller space for rotation about an axis coincident with the said top strength members, the forward fuselage section comprising a streamlined cabin and the aft fuselage section comprising a vertical fin.

3. An amphibian plane including a streamlined unit hull and fuselage structure in which the upper or fuselage portion is interrupted to provide fore-and-aft fuselage sections separated above the water line of the hull by a transverse propeller deck and by a propeller space opening laterally and upwardly of the structure from the propeller deck to the top of the fuselage portion, the said space being of a depth slightly in excess of the propeller disk radius and the said fore-and-aft fuselage sections having their opposite side walls and inner ends adjacent the propeller space disposed inwardly of the sides of the hull, an engine propeller unit mounted in the fuselage fore-section with the propeller disposed in the said propeller space for rotation about an axis at the upper end of the said space, and a longitudinal strength member at the top of the fuselage aft section and engaged with the hub of the propeller to provide a bearing support for the aft end thereof.

4. In an amphibian plane, a unit hull and fuselage structure embodying a lower boat hull keel, an upper fuselage keep composed of fore-and-aft keel sections spaced apart at the midsection of the structure and along the axis of the upper keel, an engine-propeller unit occupying the axial space in the upper keel so that the thrust axis and the upper keel substantially coincide, the forward upper keel section being attached to and supporting the engine and the aft upper keel section being engaged with and providing a bearing support for the aft end of the propeller hub, vertical strengthening members connecting the upper and lower keels, and a covering for the said structure enclosing the said keels and extending around and below the propeller to expose the same for rotation within an open space and above a deck between fore-and-aft streamlined fuselage sections.

5. An amphibian plane having, in combination, a boat hull having fore-and-aft fuselage, superstructure sections and a low decked over midsection, a sustaining wing attached to the forward fuselage section, an empennage at the rear end of the hull, an engine-propeller unit attached to and located at the aft end of the forward fuselage section and having the propeller overhanging the low decked over midsection with its axis of rotation centered laterally of the hull and fuselage superstructure in the horizontal plane of the top of the fuselage, the section of the fuselage forward of the propeller being of substantial dimensions and streamlined to provide maximum spray deck protection for the propeller with minimum interference with the propeller cast and the aft fuselage section being of such lesser dimensions as to provide a vertical fin area extending from the propeller aft to the empennage.

WALTER K. BURGESS.

CERTIFICATE OF CORRECTION.

Patent No. 2,005,728.  June 25, 1935.

WALTER K. BURGESS.

It is hereby certified that error appears in the printed specification of the above numbered patent requiring correction as follows: Page 1, first column, before line 1, insert the following paragraph:

The invention described herein may be manufactured and used by or for the Government for governmental purposes, without the payment to me of any royalty thereon.; page 4, second column, line 33, claim 4, for "keep" read keel; and that the said Letters Patent should be read with these corrections therein that the same may conform to the record of the case in the Patent Office.

Signed and sealed this 3rd day of March, A. D. 1936.

Leslie Frazer (Seal)

Acting Commissioner of Patents.